No. 765,295.

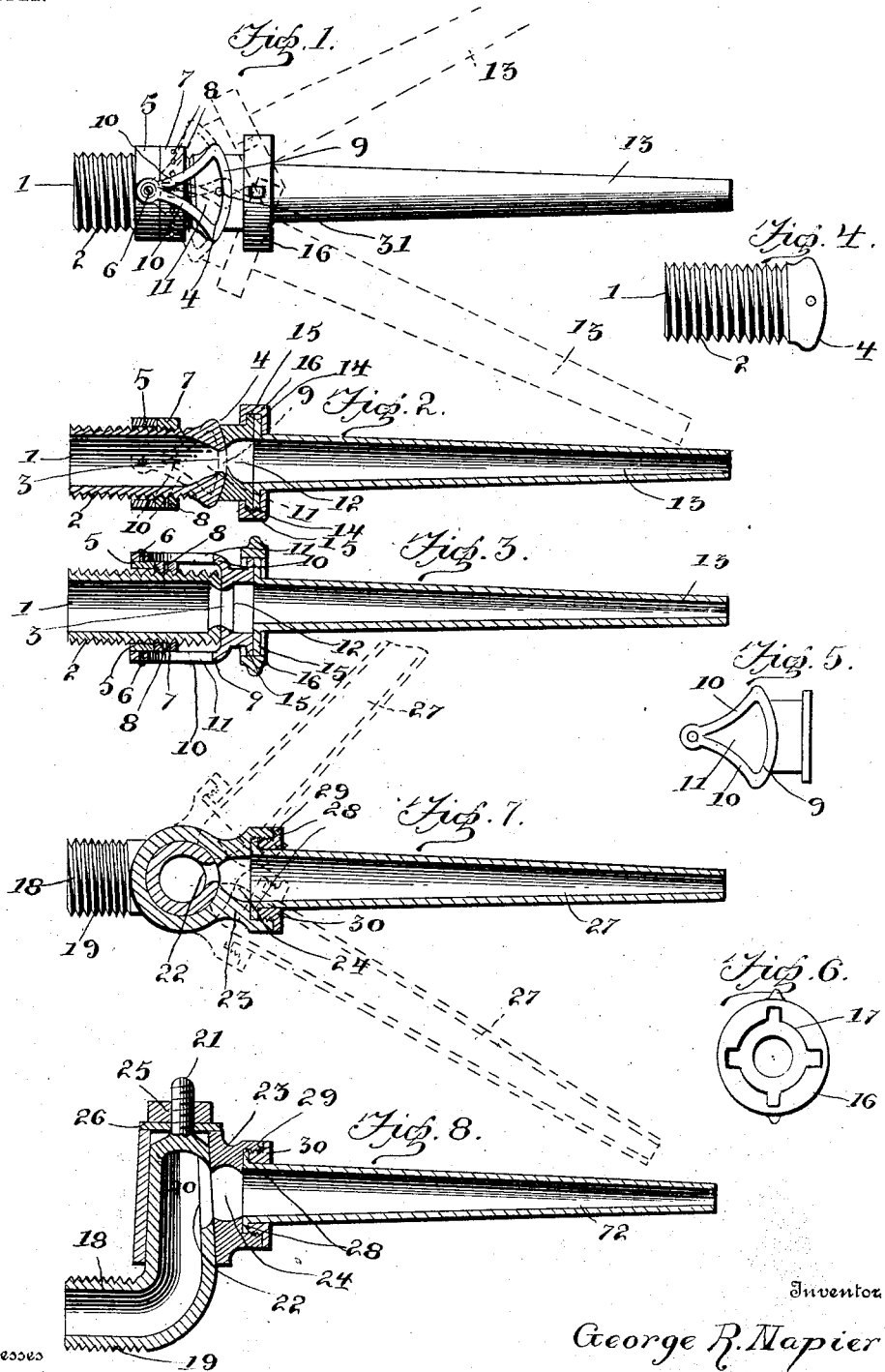

Patented July 19, 1904.

UNITED STATES PATENT OFFICE.

GEORGE REED NAPIER, OF MACON, GEORGIA.

NOZZLE-VALVE FOR SAUSAGE-STUFFERS.

SPECIFICATION forming part of Letters Patent No. 765,295, dated July 19, 1904.

Application filed February 11, 1904. Serial No. 193,182. (No model.)

*To all whom it may concern:*

Be it known that I, GEORGE REED NAPIER, a citizen of the United States, residing at Macon, in the county of Bibb and State of Georgia, have invented certain new and useful Improvements in Nozzle-Valves for Sausage-Stuffers; and I do declare the following to be a full, clear, and exact description of the invention, such as will enable others skilled in the art to which it appertains to make and use the same.

My invention is an improved nozzle-valve for sausage-stuffers; and it consists in the construction, combination, and arrangement of devices herein shown and described and claimed.

The object of my invention is to provide an improved form of nozzle-valve for sausage-stuffers in which the nozzle forms the lever for opening and closing the valve, so that when the nozzle is in one position the valve is open for the passage of the sausage-meat therethrough and when the nozzle is turned to another position the valve is closed to cut off the passage of the sausage-meat through the nozzle.

In the accompanying drawings, Figure 1 is a side elevation of a nozzle-valve embodying my invention. Fig. 2 is a central sectional view of the same. Fig. 3 is a similar view at right angles to Fig. 2. Fig. 4 is a detail elevation of the stem or inner portion of the valve. Fig. 5 is a similar view of the yoke which connects the nozzle to the stem. Fig. 6 is a similar view of the union which connects the nozzle to the yoke. Fig. 7 is a sectional view of a modified form of my invention. Fig. 8 is a similar view of the same, taken on the plane at right angles to that of Fig. 7.

Referring first to the form of my invention shown in Figs. 1, 2, and 3, a stem or inner portion 1, which is of cylindrical tubular form, is provided for a suitable distance from its inner end with the external screw-thread 2 to enable it to be secured into the side, bottom, or top of a sausage-stuffing machine of any of the well-known forms. The inner end of the bore of the stem 1 is contracted in diameter to form a port 3, and the inner end of the said stem is rounded, as at 4. A yoke-ring 5 is movable longitudinally on the threaded portion of the stem 1, but is not provided with screw-threads, and hence does not engage those of the said stem. The said yoke-ring is here shown as provided with screw-trunnions 6. A screw-ring 7, which engages a screw-thread on the stem 1, is disposed between the yoke-ring 5 and the enlarged inner end of the stem and is here shown as provided with a plurality of openings 8 for the insertion of the instruments to enable the said screw-ring to be turned in order to adjust the yoke-ring on the stem. A yoke 9, which is preferably of the form here shown, provided with arms 10, having openings 11, and further provided with a port 12, the seat of which is curved to correspond with the rounded inner end of the stem 1, is pivotally connected to the yoke-ring by means of a screw-trunnion 6. It will be understood that by appropriately adjusting the yoke-ring 5 by means of the screw-ring 7 the yoke 9 may be closed to bear snugly against the rounded inner end of the stem 1, and it will be further understood that by moving the yoke on its pivots 6 its port 12 may be closed to coincide with the port 3 in order to permit the passage of the sausage through the device or to be out of register with the port 3 in order to cut off the passage of sausage-meat through the device. The nozzle 13 is securely connected to the pivoted yoke and forms the lever or handle by means of which the latter may be turned in order to open or close the ports. Within the scope of my invention the nozzle may be secured to the pivoted yoke by any suitable means. As here shown, the nozzle and the yoke are provided at their meeting ends with notched flanges 14 and 15, respectively, and a union-ring 16 is provided, which has a notched flange 17, the said union-ring being employed to detachably secure the nozzle to the yoke. The extent to which the yoke may be turned by the nozzle to cut off the passage of sausage-meat through the device is limited by a screw-stud 31, which is screwed into the threaded opening near the inner end of the stem 1, is disposed in the opening 11 of one of the arms 10 of the yoke, and coacts with the sides of the said opening to form stops to limit the pivotal movement of the yoke.

In the form of my invention shown in Figs. 7 and 8 the stem 18 is curved or angularly formed, so that its threaded arm 19 is at right angles to the arm 20. The latter is tapered outwardly, provided at its outer end with a screw-stud 21, and is provided in one side, near its outer end, with a port 22. In this form of my invention the yoke 23 has a similarly-tapered bore, whereby it is enabled to be fitted snugly on the arm 20 for turning thereon, is provided with a port 24 to be moved into register or out of register with the port 22, and is detachably and adjustably screwed on the arm 20 by means of a nut 25, which is screwed on the stud 21, a washer 26 being interposed between the nut and the outer end of the yoke 23. The nozzle 27 has a flange 28 at its inner end, which enters a threaded socket 29, with which the yoke 23 is provided, and a screw-ring 30, which fits on the inner end of the nozzle 27, engages the said screw-threaded socket and serves to firmly and yet detachably secure the nozzle to the yoke. It will be understood that by appropriately turning the nozzle 27 the port 24 may be moved into or out of register with the port 22 to regulate the passage of the sausage-meat through the device and to entirely cut off the same when desired.

I do not desire to limit myself to either of the forms of my invention herein shown and described, as it is evident that modifications may be made therein without departing from the spirit of my invention and within the scope of the appended claim.

Having thus described my invention, what I claim as new, and desire to secure by Letters Patent, is—

In a device of the class described, the combination of a stem having a port at one end and having said end rounded, a yoke having a seat to fit the rounded end of the stem and a port to be moved into and out of register with that of the stem, and having arms extending on opposite sides of the stem, a yoke-ring adjustable on the latter, to which the said arms are pivotally connected, a screw-ring on the stem to adjust the yoke-ring and the yoke, and a nozzle connected to the latter, substantially as described.

In testimony whereof I have hereunto set my hand in presence of two subscribing witnesses.

GEORGE REED NAPIER.

Witnesses:
    BENJ. G. COWL,
    JAS. ALSKAEHL.